March 17, 1964 A. R. A. DAY 3,125,186
ADJUSTABLE HYDRAULIC SHOCK ABSORBERS
Filed Nov. 27, 1961 9 Sheets-Sheet 1

INVENTOR:
ALAN R.A. DAY

ATTORNEYS

March 17, 1964  A. R. A. DAY  3,125,186
ADJUSTABLE HYDRAULIC SHOCK ABSORBERS
Filed Nov. 27, 1961  9 Sheets-Sheet 2

INVENTOR:
ALAN R. A. DAY

ATTORNEYS

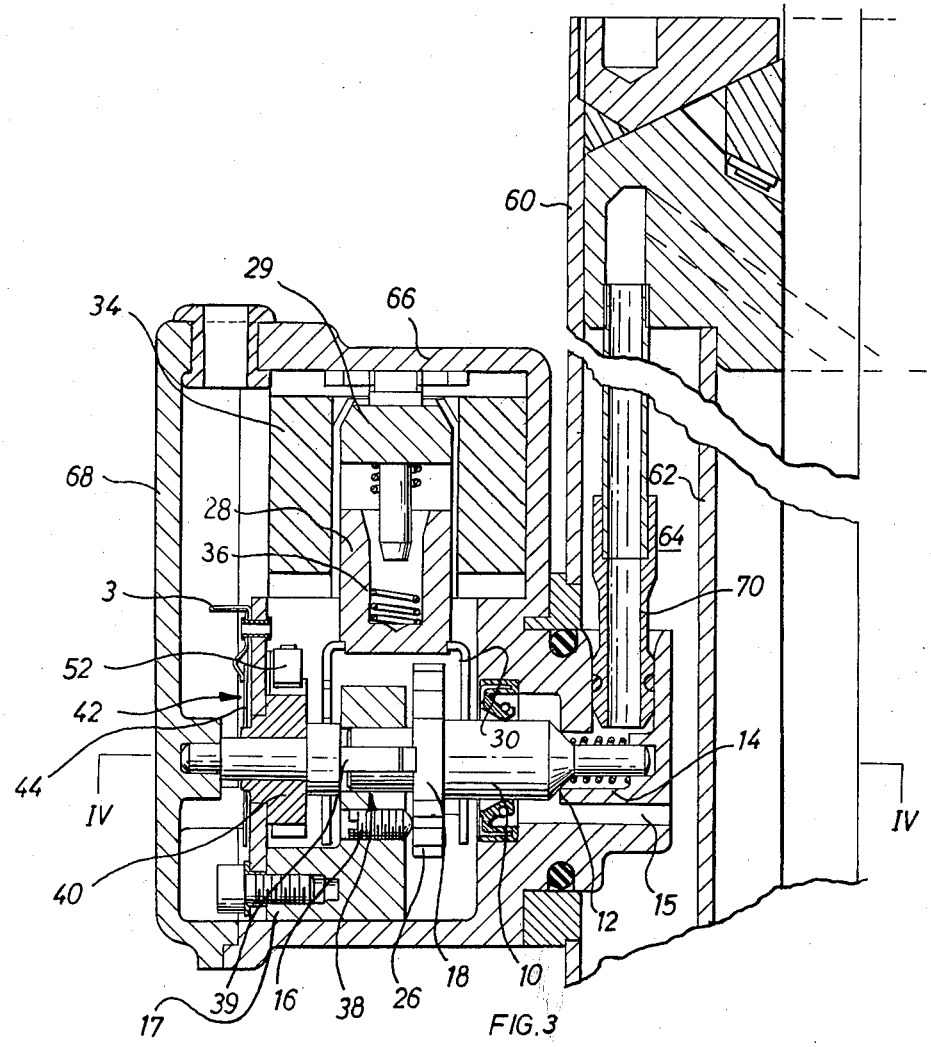

March 17, 1964   A. R. A. DAY   3,125,186
ADJUSTABLE HYDRAULIC SHOCK ABSORBERS
Filed Nov. 27, 1961   9 Sheets-Sheet 4

INVENTOR:
ALAN R.A. DAY
ATTORNEYS

March 17, 1964  A. R. A. DAY  3,125,186
ADJUSTABLE HYDRAULIC SHOCK ABSORBERS
Filed Nov. 27, 1961  9 Sheets-Sheet 6

INVENTOR:
ALAN R.A DAY
ATTORNEYS

March 17, 1964     A. R. A. DAY     3,125,186
ADJUSTABLE HYDRAULIC SHOCK ABSORBERS
Filed Nov. 27, 1961     9 Sheets—Sheet 8

INVENTOR:
ALAN R.A. DAY
ATTORNEYS

March 17, 1964  A. R. A. DAY  3,125,186
ADJUSTABLE HYDRAULIC SHOCK ABSORBERS
Filed Nov. 27, 1961  9 Sheets-Sheet 9

INVENTOR:
ALAN R A DAY

ATTORNEYS

United States Patent Office

3,125,186
Patented Mar. 17, 1964

3,125,186
ADJUSTABLE HYDRAULIC SHOCK ABSORBERS
Alan R. A. Day, York, England, assignor to Armstrong Patents Co. Limited, London, England, a British company
Filed Nov. 27, 1961, Ser. No. 155,044
Claims priority, application Great Britain Dec. 1, 1960
3 Claims. (Cl. 188—88)

This invention concerns hydraulic shock absorbers which incorporate adjustable hydraulic medium flow restricting means for enabling the shock absorber damping characteristics to be varied at will to suit differing travelling conditions, and the invention relates particularly to such shock absorbers wherein the adjustable flow restricting means is a displaceable needle valve.

A number of hydraulic shock absorber constructions have already been proposed wherein a needle valve is displaceable by a control wire or cable means operable, for example, from the dashboard or other control position of a vehicle. However, especially in a road vehicle, such wire or cable control means have shown the disadvantage that under the arduous conditions of dirt and moisture which are encountered in normal vehicle use, the control means become defective, as by sticking due to the onset of rust and other corrosion.

It is an object of the invention to provide an adjustable shock absorber which avoids the foregoing disadvantages by arranging for the adjustment to be carried out electrically.

Another object of the invention resides in the provision for an adjustable hydraulic shock absorber, of electrically actuated adjustment means which are energised only whilst an adjustment is taking place, but not otherwise.

According to the present invention in a hydraulic shock absorber wherein hydraulic medium displaced during operation of said shock absorber is constrained to flow through restricting passage means including a displaceable restrictor member governing the cross-sectional area of said passage means, there is provided an electrically operated stepping mechanism with a driven member which is displaced in discrete steps by said mechanism, said driven member being arranged correspondingly to displace said restrictor member, and switch means for selectively energising said stepping mechanism to determine the number of steps executed thereby and thereafter to de-energise said mechanism.

Preferably the switch means is in two sections, a control section for selectively connecting a source of electrical energy to the stepping mechanism according to the number of displacement steps required, and a section operable responsive to the said displacement for interrupting the said electrical connection when said displacement steps have been completed. Conveniently, the control section of the switch means may be operable at a position remote from the shock absorber and stepping mechanism.

Preferably, however, a rotary driven member which is resiliently displaceable towards and away from a valve seat of a flow restricting passage carries on one of its faces, a needle valve member co-operating with the said valve seat, and is formed on its opposite face with a series of stepped lands which are capable of bearing against a fixed abutment whereby to vary the spacing of said needle valve member from said valve seat.

The invention will be described further, by way of example, with reference to the accompanying drawings, in which:

FIGS. 1 and 1a are schematic diagrams illustrating the principle of operation of one preferred form of the invention;

FIG. 3 is a section taken on the line III—III of FIG. 2;

Throughout the several figures in the drawings similar reference numerals are used wherever appropriate to denote similar parts.

Figure 1:
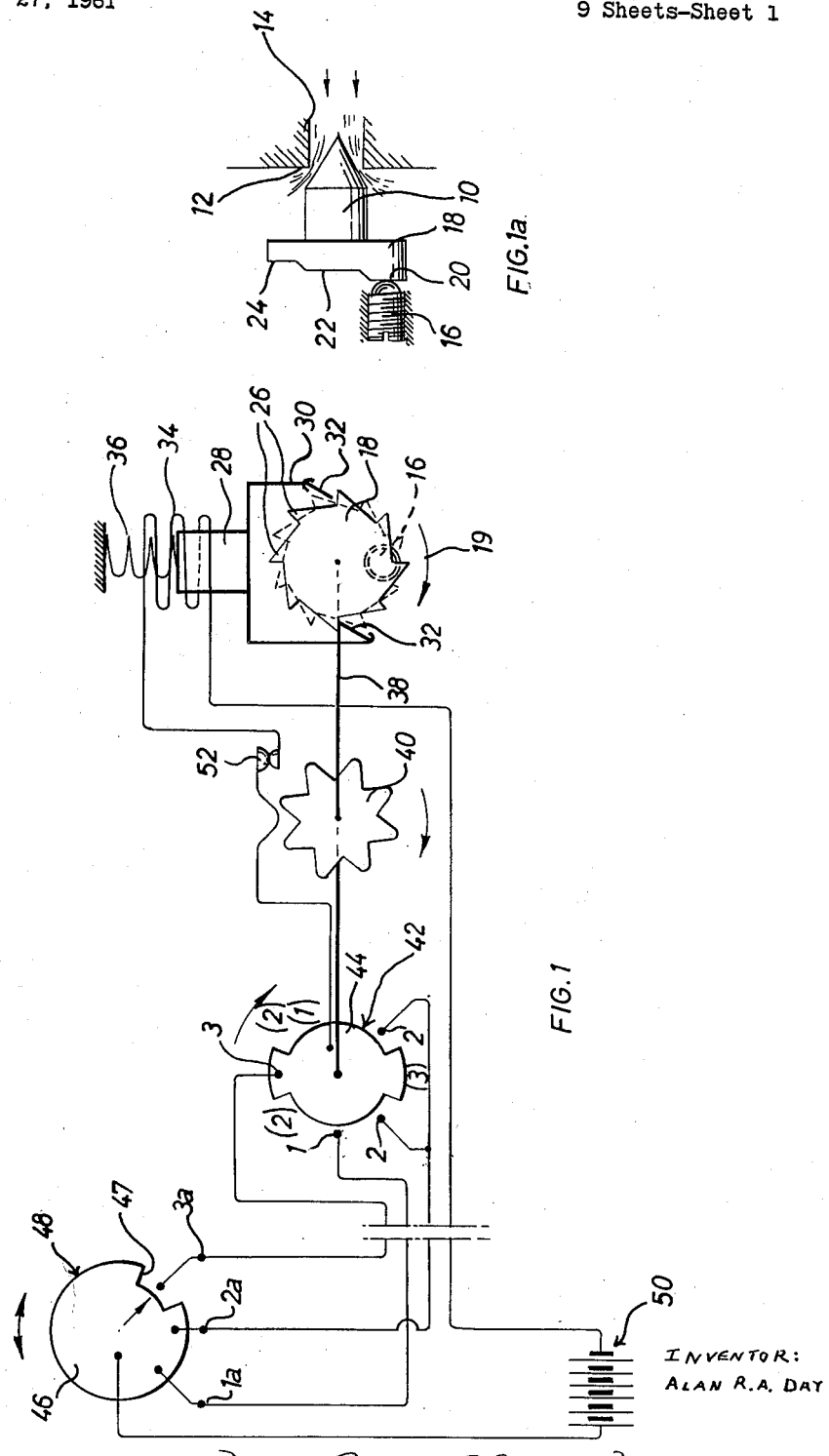

In the form of the invention illustrated in FIGS. 1 and 1a, the hydraulic medium flow restricting passage means is diagrammatically shown as comprising a needle valve member 10 arranged in spaced relation to a valve seat 12 surrounding a passage 14 provided at some suitable point in the flow path which the hydraulic medium describes during operation of the shock absorber. Resilient means (not shown) are provided for urging the valve member 10 in a direction away from the valve seat 12, and in order to enable the spacing between the valve member 10 and seat 12 to be adjusted to accord with different travelling conditions of a vehicle to which the shock absorber is fitted, said valve member is carried by and extends substantially normally to one face of a generally circular plate 18, the other face of which is formed with a plurality of lands 20 to 24 distributed around it, as hereinafter more fully described. A fixed stop 16 is provided as an abutment for the lands 20 to 24, and thus, dependent upon which of the lands abuts against the stop 16, the valve member 10 will be set to one of a number of possible spacings relative to the valve seat 12 as the plate 18 is rotated.

As indicated in FIG. 1, the plate 18 is peripherally formed with ratchet teeth 26, and a stepping mechanism is provided for rotating plate 18, comprising a solenoid-operated plunger 28 which at its free end presents a pawl carrier 30 terminating in pivotally attached pawls 32 engageable with the ratchet teeth 26. The plunger 28 moves within a solenoid 34, and behind the plunger is arranged a return spring 36 for restoring the plunger after it has been retracted on energisation of the solenoid.

The circular plate 18 is fixedly mounted on a rotatable shaft 38 which also carries a star wheel 40 and the rotatable wiper element 44 of a switch segment generally designated 42 having a number of stationary switch contacts 1 to 3 each corresponding to one of the possible settings of the valve member 10 as determined by the number of lands 20 to 24 on the plate 18. Each of the contacts 1 to 3 of the switch segment 42 in turn corresponds to one of the contacts 1a to 3a of an independent, manually operable switch 48 having a rotatable wiper element 46.

The arrangement described above is intended normally to be operated from a secondary battery, for example from the battery 50 carried by a conventional road vehicle, and for this purpose, one end of the solenoid winding 34 is permanently connected to one terminal of the battery 50. The other end of the solenoid winding is then connected through interrupter contacts 52 operable by the star wheel 40 to the wiper element 44 of switch segment 42. Through the wiper element 44, this end of the solenoid winding 34 is then extended to one of the stationary contacts 1a to 3a of the switch 48, the second terminal of the battery 50 being permanently connected to the wiper element 46, which will be seen to be formed with a notch or recess 47. As indicated by the broken lines between the two switches, the manually operable switch 48 may be arranged at a position remote from the switch segment 42.

In operation, assuming that the wiper elements 44 and 46 and the valve member 10 are in the positions shown in FIGS. 1 and 1a, the switchable connection between the battery 50 and the solenoid winding 34 is broken on the one hand by the presence of the recess 47 opposite the fixed contact 3a, and on the other hand by the absence of the wiper element 44 from either of the fixed contacts 1 or 2. The solenoid is thus de-energised, and the fixed stop 16 abuts against the highest land 20 of the circular plate 18 to maintain the valve member 10 in its position of closest approach to the valve seat 12, resulting in the maximum restriction to flow of hydraulic medium past the valve. The drawings show, by way of example, three possible switch settings, and correspondingly, the lands 20 to 24 are respectively of three different heights, to give three possible adjustments of the valve member 10. Thus, diametrically opposite the highest land 20, is the lowest land 24, and between the lands 20 and 24, on either side thereof, are intermediate lands 22, both the lands 22 being of the same height as one another. When it is desired to change the position of the valve member 10, therefore, the wiper element 46 of the manually operable switch is rotated to bring the recess 47 opposite the fixed contact of the switch which corresponds to the chosen position. If this is the position corresponding to the fixed contact 2a, the wiper 46 is moved to bring recess 47 into register with contact 2a, and this causes battery to be extended to the fixed contact 3 of switch segment 42, since the movement of the wiper 46 connects it with the fixed contact 3a, which previously was open. The solenoid 34 is therefore energised and causes the plunger 28 to retract, whereupon the lefthand pawl 32, as viewed in FIG. 1 engages with the currently adjoining ratchet tooth 26 to rotate the circular plate 18 in the direction of the arrow 19, into the position shown in dotted lines. This rotation of plate 18 also causes the shaft 38 to rotate, and hence moves the wiper element 44 off the contact 3 and towards the contact 2, thereby breaking the connection between the battery and solenoid. Simultaneously, the star wheel 40 opens the interrupter contacts 52 as the plunger 28 nears the top of its stroke and in advance of the disengagement of the wiper 44 from the live contact 3, thereby preventing arcing from taking place. Finally, as the plunger 28 is being restored by its return spring, the righthand pawl 32 engages the then adjoining ratchet tooth 26 to complete the rotary movement of plate 28 required to bring the appropriate land 22 against the stop 16, to position the wiper element 44 fully in register with the fixed contact 2, and to allow the interrupter contacts 52 to close again.

If it is desired to change the setting of valve member 10 not simply from one land to an adjoining land as described above, but, for example, from the land 20 to the land 24, then the wiper element 46 of the manual switch 48 is moved from position 3 to position 1, to bring the recess 47 into register with the fixed contact 1a. Similar movements of the plate 18, star wheel 40 and wiper element 44 then again take place as the solenoid 34 is first energised and then de-energised, but in this case, when the wiper element 44 moves on to the fixed contact 2, it is still connected to battery through the element 46, so that the cycle of operations is repeated until the element 46 rests on contact 1, and the battery connection to the solenoid is broken. During this time, the rotation of the circular plate 18 brings firstly, one of the lands 22 into register with the stops 16, and finally the land 24 into register therewith.

Figure 4:
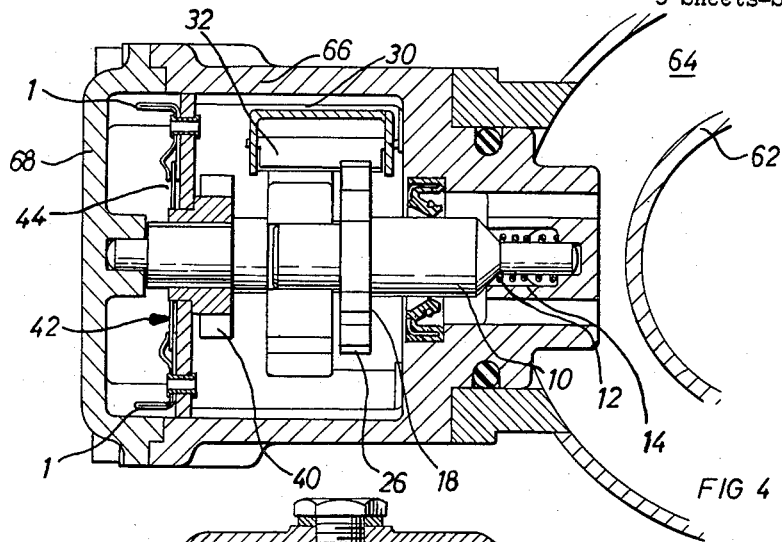
FIG. 4 is a section taken on the line IV—IV of FIG. 3.

In FIGS. 2 to 5, which show one particular construction embodying the foregoing principles of operation, similar reference numerals are employed wherever appropriate to denote parts similar to those of FIGS. 1 and 1a. As best seen in FIGS. 3 and 4, a part of a telescopic shock absorber casing is indicated at 60, and part of a pressure chamber 62 arranged concentrically therein to house a working piston (not shown) by which hydraulic medium is displaced during operation of the shock absorber, the space 64 between the casing 60 and pressure chamber serving as a hydraulic medium reservoir. To the casing 60, there is secured an auxiliary housing 66 which is normally closed by a cover plate 68, and which extends into the reservoir space 64. Within the reservoir space 64, the housing 66, which is formed internally with a valve chamber presenting the aforementioned passage 14 and valve seat 12 is engaged with an upstanding tube 70 whereby the displaced hydraulic medium is conducted to further parts (not shown) of the shock absorber, and is bored at 15 to provide a communication with the valve chamber and the reservoir space 64.

Figure 2:
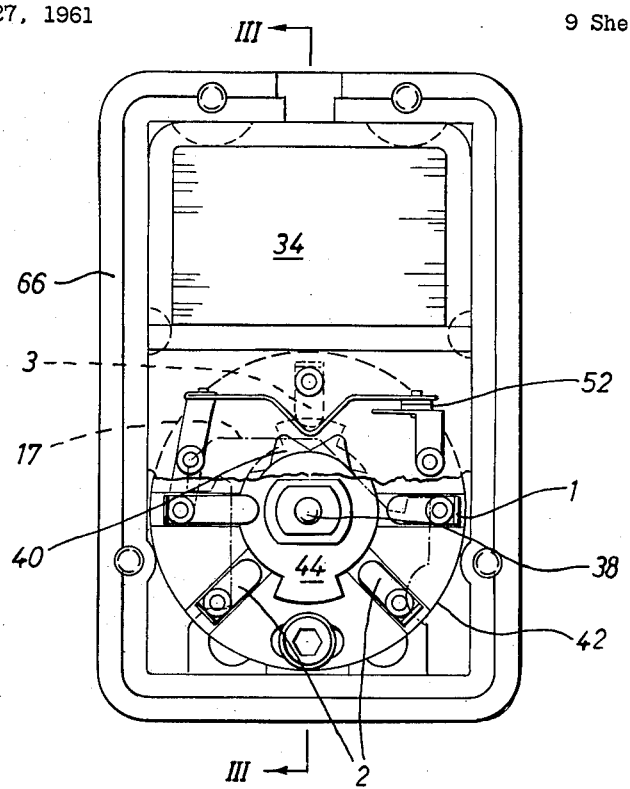
FIG. 2 is a front elevation, with the cover removed, of a stepping mechanism and switch means embodying the form of the invention shown in FIG. 1.
Figure 5:
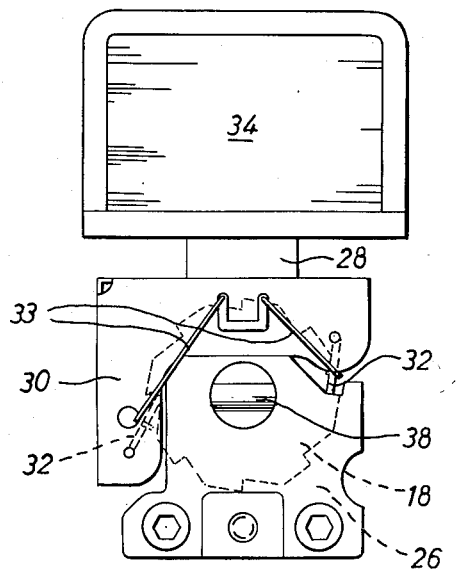
FIG. 5 is a detail showing the stepping mechanism.

The solenoid winding 34 is mounted at an upper region of the housing 66 and has a two-part core consisting of a fixed core part 29 and the movable plunger 28, with the return spring 36 arranged between them. From the lower end of the plunger 28 depends the pawl carrier 30, which, as evident from FIG. 5 is of generally U-shaped configuration, with a pawl 32 pivotally attached towards the extremity of each leg of the U. The carrier 30 also provides a mounting for pawl springs 33 which urge the pawls into engagement with the ratchet teeth 26 of plate 18. The shaft 38 is formed in two parts, one of which extends rearwardly from the face of plate 18 opposite to that from which the valve member 10 extends, and which is slotted to receive a tongue 39 of the other shaft part, the tongue 39 serving to join the two shaft parts together. The free end of this other shaft part, which carries the star wheel 40 and wiper element 44, is journalled in the cover plate 68. In FIG. 2 there is indicated the arrangement of the stationary contacts 1 to 3 of the switch segment 42, together with a raised housing portion 17, also visible in FIG. 3, which provides a mounting for the fixed stop 16. It will be appreciated that since only a very small movement of the valve member 10 is required to alter substantially the restriction offered to the flow of hydraulic medium in the passage 14, the heights of the various lands 20 to 24 relative to the plate 18 are too small to be adequately defined in FIGS. 3 and 4. For this reason, the lands are to an exaggerated scale in the diagrammatic illustrations of FIGS. 1 and 1a.

The electrical actuation of the valve member 10 proposed by the invention thus enables the disadvantages arising from rust, dirt and other causes in prior, wire- or cable-operated constructions to be avoided, and enables selection of the required valve setting to be made by installing the manually operable switch 48 at any convenient position remote from the shock absorber itself. It will be noted that, once the switch 48 has been turned to a chosen position, the operation of the stepping mechanism is thereafter automatic in that the arrangement is dependent upon the wiper element 44 hunting to a de-energised stationary contact amongst the contacts 1 to 3. Hence, battery power is required only for such time as the stepping mechanism is actually in operation, and the resulting power consumption is extremely small, typically of the order of a few hundred milli-amperes at the 12 volts battery potential most usual in road vehicles.

Figure 6:
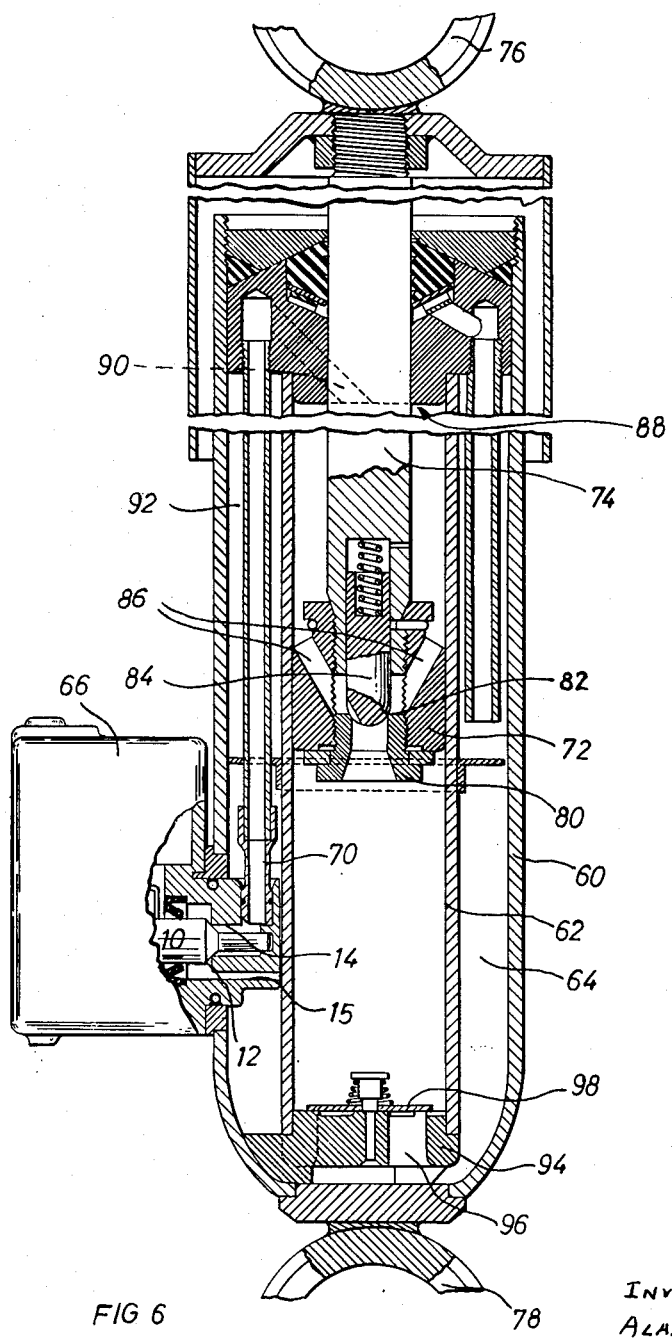
FIG. 6 is a longitudinal sectional elevation of a telescopic shock absorber fitted with the adjustment means of FIGS. 2 to 5.

In FIG. 6 of the drawings, the invention is shown as applied to a telescopic shock absorber comprising a piston 72 carried by a piston rod 74 terminating in an eye 76 adapted for securing to one part of a vehicle, for example, the vehicle frame, the piston being arranged for sliding movement within a pressure cylinder 62 secured indirectly at its ends to an outer cylindrical casing 60 which carries an eye 78 adapted for securing to a second part of the vehicle, such as a wheel mounting. The piston is axially bored to receive a hollow plug member 80 formed at its inner end with a valve seat 82 for a valve member 84 resiliently disposed in the piston and its connecting rod, and behind the seat 82, oblique bores 86 lead from the piston bore to the interior space of the cylinder 62.

At its upper end region, the connecting rod 74 passes through an upper bearing and hydraulic sealing gland assembly generally designated 88, and a passage 90 formed in this assembly communicates at one end with the cylinder interior space behind the piston and at its other end with a tube 92 depending downwardly from the assembly 88, in the reservoir space 64. The bearing and seal assembly 88 serves to locate the upper end of the pressure cylinder 62, and the lower end of the cylinder 62 is engaged on and closed by a foot bearing 94 carried by the outer casing 60. The foot bearing 94 is apertured as at 96 to permit communication between the reservoir space 64 and the interior of cylinder 62 in front of the piston 72, and a spring-loaded plate valve 98 is provided on the bearing 94 to control the liquid flow through said apertures.

The adjustment means proposed by the invention, enclosed within its own housing 66, is fitted to the outer casing 60 of the shock absorber shown in FIG. 6, at a position close to the foot bearing 94 and in such a manner that the upstanding tube 70 engages the free lower end of the dependent tube 92.

In operation, the incidence of relative motion between the piston 72 and its pressure cylinder 62 sets up a unidirectional flow of hydraulic medium in the shock absorber, since on each downward stroke of the piston, the valve member 84 lifts to enable hydraulic medium to pass through the piston into the cylinder space behind it, the foot valve 98 remaining closed; whilst on each upward stroke of the piston 72, the valve member 84 remains closed, the foot valve 98 opens to admit hydraulic medium from the reservoir space 64 into the cylinder space in front of the piston, and at the same time the piston motion displaces the hydraulic medium which previously passed through it and into the cylinder space behind it from that space to the reservoir 64 by way of the tube 92. Additionally, on each downward stroke of the piston rod, due to the introduction of part of the piston rod 74 into the cylinder 62, an excess or differential amount of hydraulic medium is displaced from the cylinder space behind the piston, through the passage 90 and into the reservoir 64.

The restriction offered to the flow of hydraulic medium thus set up is a function of the size of the bores 86, the passage 90 and the apertures 96, and also of the size and spring-loading exerted upon the valve members 84 and 98. Such restriction, however, is governed to an even greater degree by the setting of the valve member 10 which, it will be noted, controls the cross-sectional area of the flow path available to the hydraulic medium passing through the reservoir 64. Thus, by operation of the stepping switch mechanism contained within the housing 66, as already fully described with reference to FIGS. 1 to 5, the valve member 10 may be so positioned relative to the seat 12 as to provide a selected degree of restriction to fluid flow, which in turn enables the degree of damping effected by the shock absorber to be selected to meet changing road conditions.

Figure 9:
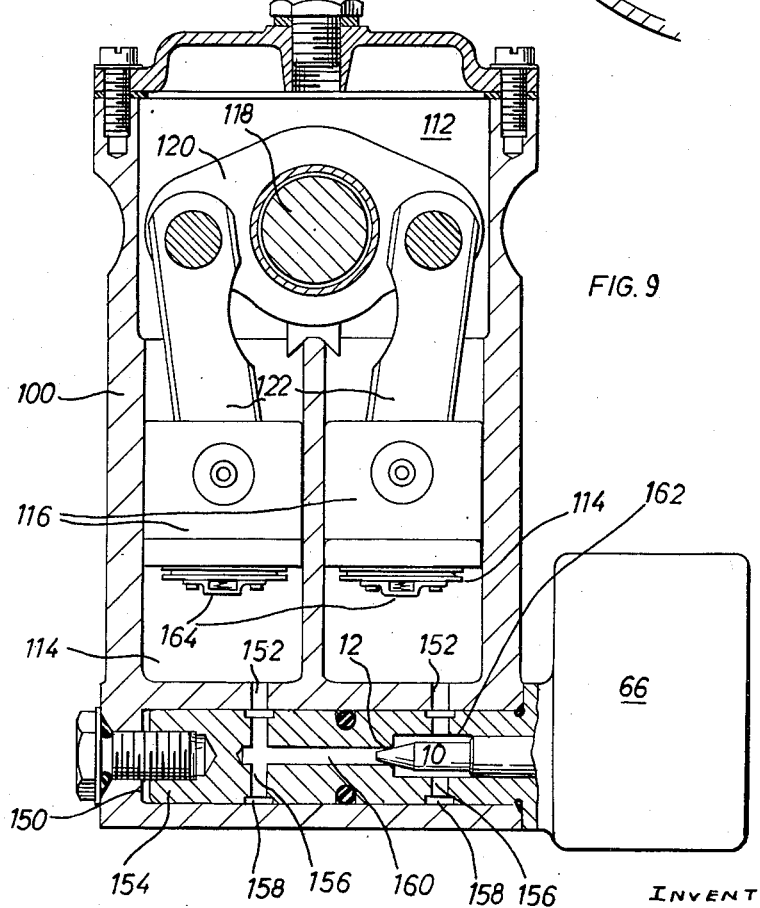
FIG. 9 is a section taken on the line IX—IX of FIG. 7.
Figure 7:
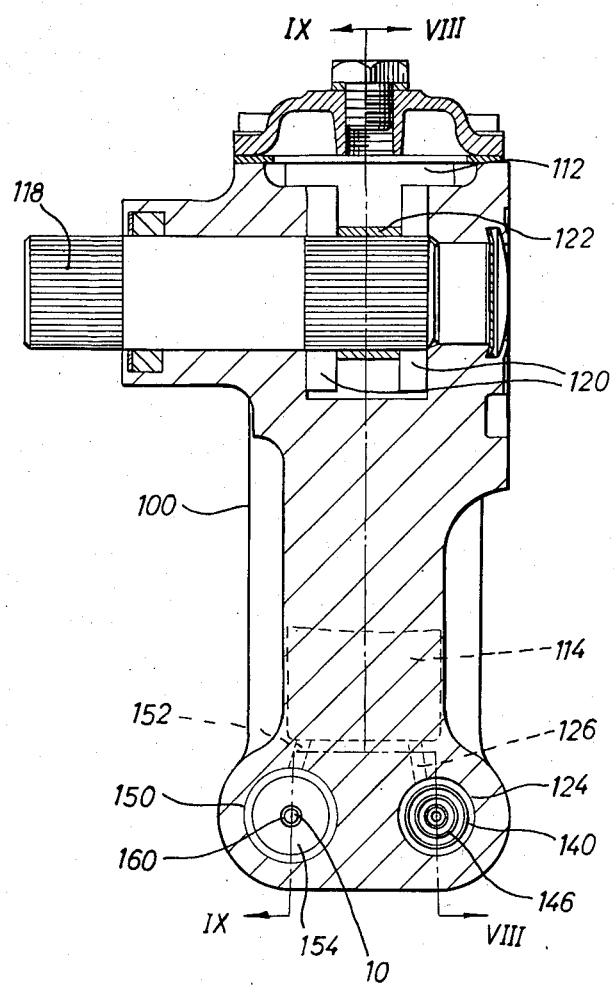
FIG. 7 is a transverse vertical section through a lever-type shock absorber fitted with the adjustment means of FIGS. 2 to 5.
Figure 8:
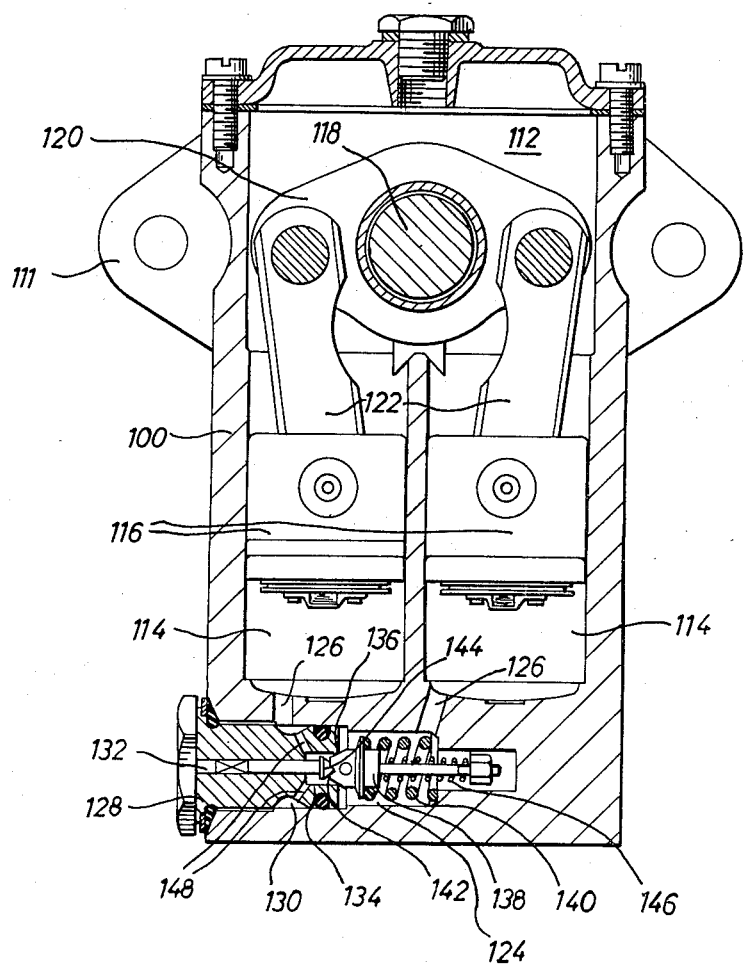
FIG. 8 is a section taken on the line VIII—VIII of FIG. 7.

FIGS. 7 to 9 show the application of the invention to a lever-type shock absorber. As more particularly evident from FIGS. 8 and 9, the illustrated lever-type shock absorber comprises a housing 100 having a hollow interior 112 serving as a reservoir for hydraulic medium, and a pair of hydraulic cylinders 114 opening at one end from the reservoir 112 and arranged in parallel, side-by-side relationship within the housing 100. A hollow piston 116 is displaceably received in each cylinder 114, and a rockable spindle 118 which extends through the reservoir space 112 above the two cylinders is journalled in the housing 100 for turning movement relative thereto. The spindle 118 carries a symmetrical crank plate 120, and a pivotally arranged connecting rod 122 extends from the crank plate 120 to each of the pistons 116.

Across the bottom of the housing 100, immediately below the cylinders 114, is formed a valve chamber 124 (FIG. 8), and bores 126 are provided to connect the bottom ends of the cylinders respectively to opposite end regions of the valve chamber. At its outer end, the chamber 124 is threaded to receive an axially bored plug 128 having a peripheral groove 130 registering with the bore 126 leading from the lefthand cylinder 114 (as viewed in FIG. 8), and the axial bore 132 of the plug is counterbored at 134 to define a valve seat 136 at the inner end of the plug. A hollow valve member 138 having a conical valve face is urged by means of a spring 140 against the seat 136, and the end of the valve member 138 within the counterbore 134 is also formed as a valve seat 142 cooperating with a second valve member 144 which is urged towards said seat by means of a spring 146. Oblique passages 148 are formed in the plug 128 to connect the groove 130 thereof with the counterbore 134.

Turning now to FIGS. 7 and 9, the shock absorber housing 100 is also formed, parallel to the valve chamber 124, with a further bore 150 likewise connected to each of the hydraulic cylinders 114 by means of a passage 152. The housing 66 containing the adjustment means of the invention is, in this embodiment, slightly modified by the provision of an externally directed, cylindrical spigot 154 adapted to fit within the housing bore 150 and having spaced, diametrical ports 156 therein each positioned to register with one of the passages 152. The ports 156 run into peripheral grooves 158 which ensure their being placed in communication with the passages 152. The spigot 154 is axially bored at 160 and counterbored at 162, and the junction between the said bore and counterbore constitutes the valve seat 12 of FIGS. 2 to 5, it being noted that this valve seat is intermediate the passages 152.

In the operation of the shock absorber of FIGS. 7 to 9, with the housing 100 secured by means of lugs 111 to a vehicle chassis and the shaft 118 connected externally of the housing 100 by means of a lever arm (not shown) to a suitable part of the vehicle wheel mounting, vertical oscillations of the wheel mounting arising during travel of the vehicle set up a rocking motion of the spindle 118 which causes the pistons 116 to be reciprocated in their hydraulic cylinders 114. The springs 140 and 146 which urge the valve members 138 and 144 on to their respective seats are calculated to allow these valve members to lift when subjected to pressures exceeding predetermined maximum values, and the relation between these two pressures determines the amount of damping offered to movement of the wheel mounting in one direction as compared to movement thereof in the opposite direction. In the construction illustrated, the left-hand piston 116 is subjected to compression or bump strokes of the wheel mounting, and the righthand piston to rebound strokes, and the resistance to movement in the bump direction is arranged to be less than that to movement in the rebound direction. On each downward or compression stroke of the lefthand piston 116 in its cylinder, therefore, hydraulic medium is forced from that cylinder, through the bore 126 thereof to the peripheral groove 130 of the plug 128, and then through the oblique passages 148 of the plug into the counterbore 134, when the valve member 138 is caused to lift and permit a restricted flow of hydraulic medium past it. At the same time, the righthand piston 116 is moving upwardly in its cylinder, and creating a suction to draw in the hydraulic medium flowing through the valve chamber 124. During the subsequent rebound movement of the wheel mounting, the flow of hydraulic medium is reversed, taking place from the righthand cylinder to the lefthand cylinder, and the valve member 144 lifts to permit this flow, although to a still more restricted extent. In both cases, cavitation is avoided by the operation of recuperation valves (generally designated 164) in the pistons 116, and which operate if necessary to allow any deficiency of hydraulic medium in either cylinder to be made up from the reservoir 112. Such recuperation valves may, for example be ball valves carried by the pistons to permit hydraulic medium to flow through them from the reservoir into the cylinder.

In addition to the hydraulic flow path through the valve chamber 124, however, a parallel flow path, controlled by the valve member 10, is provided by the passages 154, the ports 156 and the bore and counterbore 160 and 162 of the spigot 154. Thus, the resistance to fluid flow and therefore the damping characteristics of the shock absorber may be altered by operation of the stepping mechanism within the housing 66 to change the position of the valve member 10 relative to its seat 12, and the change is, of course, the same in both the compression and the rebound directions.

Figure 10:
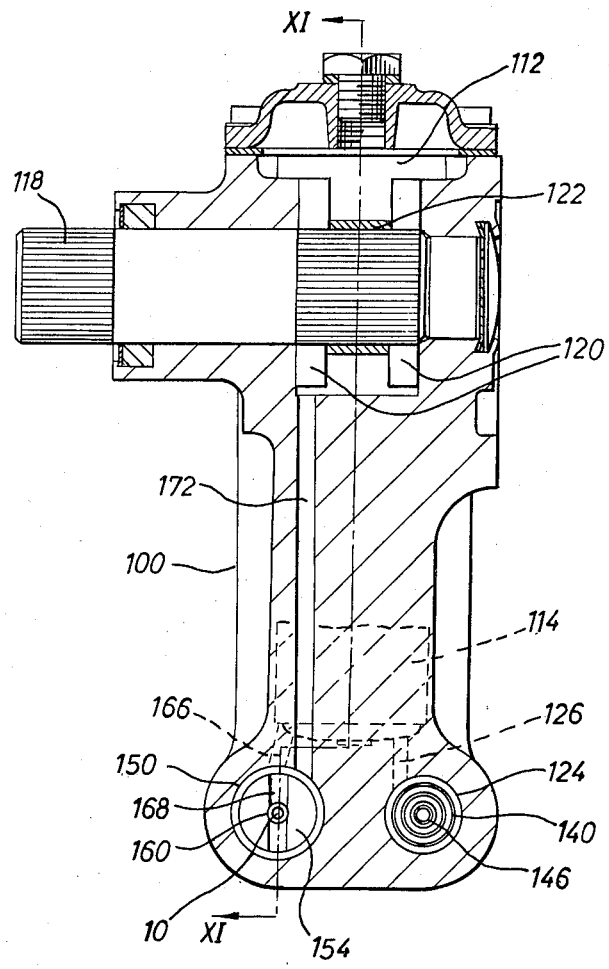
FIG. 10 is a section similar to that of FIG. 7 through a modified lever-type shock absorber.
Figure 11:
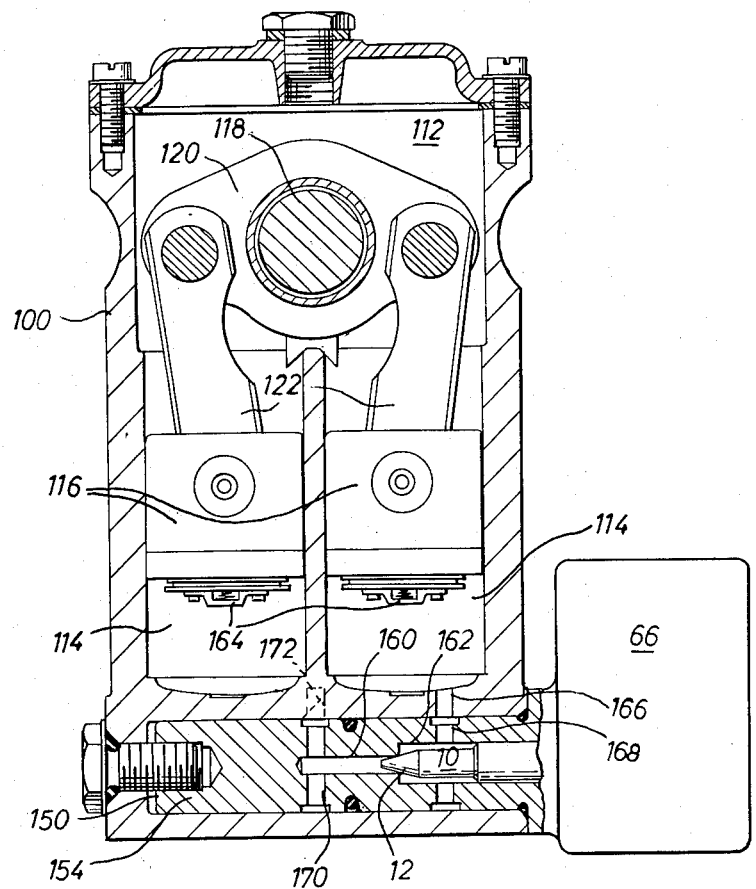
FIG. 11 is a section taken on the line XI—XI of FIG. 10.

A modification of the construction of FIGS. 7 to 9 whereby the resistance to fluid flow is variable in only one of these directions is shown in FIGS. 10 and 11, wherein only the righthand or rebound cylinder 116 communicates, through a passage 166 in the housing 100 and a first diametrical port 168 in the spigot 154, with the axial bore 160 and counterbore 162. A second diametrical port 170 in the spigot, however, communicates with a passage 172 formed in the housing 100 between the bore 150 and the reservoir space 112 and thus the fluid flow from the righthand to the lefthand cylinder 114 is governed by the position of the valve member 10 relative to its seat 12, so that by changing the position of the valve member, the degree of damping exerted on the rebound stroke may be altered. In all other respects, the construction and operation of this embodiment is identical with that of FIGS. 7 to 9.

I claim:

1. In a hydraulic shock absorber system, a telescopic, hydraulic shock absorber comprising a hydraulic cylinder, an apertured piston assembly telescopically arranged in said cylinder and defining a hydraulic pressure chamber at one end region of said cylinder, a hydraulic reservoir cylinder coaxially surrounding said hydraulic cylinder and co-operating with said hydraulic cylinder to define a hydraulic reservoir therearound, first passage means including first fluid flow restricting means connecting said reservoir with said pressure chamber, second fluid flow restricting means in the piston apertures, second passage means connecting the other end region of said hydraulic cylinder with said reservoir, a valve seat in said second passage means and a valve member co-operating with said valve seat to govern the cross-sectional area of said second passage means; an auxiliary housing carried by said reservoir cylinder, a solenoid in said auxiliary housing, an axially and resiliently displaceable ratchet wheel adjacent said solenoid, an armature displaceable on energisation of said solenoid, pawl means on said armature and engaged with said ratchet wheel for rotating said wheel in discrete steps responsive to energisation of said solenoid, said valve member extending axially from one face of said ratchet wheel and the other face of said wheel being formed with a plurality of circularly spaced, stepped lands, a fixed abutment in said auxiliary housing and bearing against said other face of said ratchet wheel; a solenoid energising circuit, and control means for said circuit comprising a first multiple position rotary switch having a rotatable switching member rotatable with said ratchet wheel and a second multiple position rotary switch having a manually rotatable switching member for completing said energising circuit and effecting a rotation of said ratchet wheel whenever said two switching members are displaced from a predetermined phase relationship with one another, thereby axially to displace said ratchet wheel by moving the lands thereof relative to said abutment and also to displace said first-mentioned switching member for restoring said predetermined phase relationship and interrupting said energising circuit.

2. In a hydraulic shock absorber system, a double-acting, lever-type hydraulic shock absorber comprising an at least partly hollow body member, the hollow interior of said body member constituting a hydraulic reservoir, a pair of hydraulic cylinders each communicating at one end directly with said reservoir, a piston in each cylinder, a rockable shaft journalled in said body member and passing through said reservoir adjacent said cylinder ends, means connecting said shaft with said pistons for displacing said pistons in said cylinders responsive to turning movement of said shaft relative to said body member, said body member being formed with first and second valve chambers hydraulically connecting the other ends of said cylinders, and hydraulic damping valve means in said first chamber for restricting the flow of hydraulic medium between said cylinders during said piston displacement; an auxiliary housing carried by said body member adjacent said second valve chamber, a solenoid in said housing, an axially and resiliently displaceable ratchet wheel adjacent said solenoid, an armature displaceable on energisation of said solenoid, pawl means on said armature and engaged with said ratchet wheel for rotating said wheel in discrete steps responsive to energisation of said solenoid, a valve seat in said second valve chamber, a valve member extending axially from one face of said ratchet wheel and co-operating with said valve seat to govern the cross-sectional area of said second valve chamber, the other face of said ratchet wheel being formed with a plurality of circularly spaced, stepped lands, a fixed abutment in said auxiliary housing and bearing against said other face of said ratchet wheel; a solenoid energising circuit, and control means for said circuit comprising a first multiple position rotary switch having a rotatable switching member rotatable with said ratchet wheel and a second multiple position rotary switch having a manually rotatable switching member for completing said energising circuit and effecting a rotation of said ratchet wheel whenever said two switching members are displaced from a predetermined phase relationship with one another, thereby axially to displace said ratchet wheel by moving the lands thereof relative to said abutment and also to displace said first-mentioned switching member for restoring said predetermined phase relationship and interrupting said energising circuit.

3. In a hydraulic shock absorber system, a double-acting lever-type hydraulic shock absorber comprising an at least partly hollow body member, the hollow interior of said body member constituting a hydraulic reservoir, a pair of hydraulic cylinders each communicating at one end directly with said reservoir, a piston in each cylinder, a rockable shaft journalled in said body member and passing through said reservoir adjacent said cylinder ends, means connecting said shaft with said pistons for displacing said pistons in said cylinders responsive to turning movement of said shaft relative to said body member, said body member being formed with a valve chamber hydraulically connecting the other ends of said cylinders, and hydraulic damping valve means in said valve chamber for restricting the flow of hydraulic medium between said cylinders during said piston displacement; by-pass passage means including a valve seat hydraulically connecting said other end of one of said cylinders with said reservoir, an auxiliary housing carried by said body member adjacent said passage means, a solenoid in said housing, an axially and resiliently displaceable ratchet wheel adjacent said solenoid, an armature displaceable on energisation of said solenoid, pawl means on said armature and engaged with said ratchet wheel for rotating said wheel in discrete steps responsive to energisation of said solenoid, a valve member extending axially from one face of said ratchet wheel and co-operating with said valve seat to govern the cross-sectional area of said second valve chamber, the other face of said ratchet wheel being formed with a plurality of circularly spaced, stepped lands, a fixed abutment in said auxiliary housing and bearing against said other face of said ratchet wheel; a solenoid energising circuit, and control means for said circuit comprising a first multiple position rotary switch having a rotatable switching member rotatable with said ratchet wheel and a second multiple position rotary switch having a manually rotatable switching member for completing said energising circuit and effecting a rotation of said ratchet wheel whenever said two switching members are displaced from a predetermined phase relationship with one another, thereby axially to displace said ratchet wheel by moving the lands thereof relative to said abutment and also to displace said first-mentioned switching member for restoring said predetermined phase relationship and interrupting said energising circuit.

References Cited in the file of this patent
UNITED STATES PATENTS

| | | |
|---|---|---|
| 2,950,785 | Patriquin | Aug. 30, 1960 |

FOREIGN PATENTS

| | | |
|---|---|---|
| 387,991 | France | May 19, 1908 |
| 448,069 | France | Nov. 12, 1912 |
| 1,043,657 | France | June 17, 1953 |
| 1,175,293 | France | Nov. 10, 1958 |